US006448299B1

(12) United States Patent
Brown et al.

(10) Patent No.: US 6,448,299 B1
(45) Date of Patent: Sep. 10, 2002

(54) REGENERATION OF STRONG-BASE ANION-EXCHANGE RESINS BY SEQUENTIAL CHEMICAL DISPLACEMENT

(75) Inventors: Gilbert M. Brown, Knoxville; Baohua Gu; Bruce A. Moyer, both of Oak Ridge; Peter V. Bonnesen, Knoxville, all of TN (US)

(73) Assignee: U.T. Battelle, LLC, Oak Ridge, TN (US)

( * ) Notice: Subject to any disclaimer, the term of this patent is extended or adjusted under 35 U.S.C. 154(b) by 0 days.

(21) Appl. No.: 09/491,242

(22) Filed: Jan. 25, 2000

(51) Int. Cl.[7] .................................................. B01J 49/00
(52) U.S. Cl. ............................ 521/26; 521/28; 521/32; 525/370
(58) Field of Search .............................. 521/26, 32, 28; 525/370

(56) References Cited

U.S. PATENT DOCUMENTS

| | | | |
|---|---|---|---|
| 3,989,624 A | | 11/1976 | Wachsmuth |
| 4,049,772 A | | 9/1977 | Takada et al. |
| RE29,680 E | | 6/1978 | Salem et al. |
| 4,151,079 A | | 4/1979 | Horembala |
| 4,608,176 A | | 8/1986 | Fleming |
| 4,738,834 A | | 4/1988 | Moore et al. |
| 4,785,020 A | * | 11/1988 | Boom ......................... 521/32 |
| 5,478,474 A | | 12/1995 | Katti et al. |

OTHER PUBLICATIONS

F. Helfferich, "Ion Exchange", (1962), 168–169,513–515, McGraw–Hill, (New York).*
N.C. Schroeder et al., Technetium Partitioning for the Hanford Tank Waste Remediation System: Sorption of Technetium from DSS and DSSF-7 Waste Simulants Using Reillex TM–HPQ Resin, Los Alamos National Laboratory, Chemical; Science and Technology Division, Nuclear and Radiochemistry Group, pp 1–69, 1995.*
Damian, Environment Protection, pp. 24–31, Jun. 1999.
Urbansky, Bioremediation Journal(vol. 2), pp. 81–95, 1988.
Kawasaki, Radiochimica Acta 63, pp. 53–56, 1993.
Batista et. al, Division of Environmental Chemistry Preprints of Extended Abstracts vol. 39(2), pp. 84–86, Aug. 1999.
Tripp, Division of Environmental Chemistry Preprints of Extended Abstracts vol. 39(2), pp. 79–80, Aug. 1999.
Guter, Division of Environmental Chemistry Preprints of Extended Abstracts vol. 39(2), pp. 76–78, Aug. 22–26, 1999.
Abu–Omar, Inorganic Chemistry, vol. 35(26), pp. 7751–7757, 1996.
Abu–Omar, Inorganic Chemistry, vol. 34, pp. 6239–6240, 1995.
Liu, Inorganic Chemistry, vol. 23, pp. 3418–3420, 1984.
Janio, et al. Pol. Environ. Prot. Eng. vol. 9 pp. 67, 1983.
Vladescu, Romania Chemistry Review, 23 (1) pp. 135–143, 1980.

* cited by examiner

*Primary Examiner*—Fred Zitomer
(74) *Attorney, Agent, or Firm*—J. Herbert O'Toole; Nexsen Pruet Jacobs & Pollard, LLC

(57) ABSTRACT

A method for regenerating strong-base anion exchange resins utilizing a sequential chemical displacement technique with new regenerant formulation. The new first regenerant solution is composed of a mixture of ferric chloride, a water-miscible organic solvent, hydrochloric acid, and water in which tetrachloroferrate anion is formed and used to displace the target anions on the resin. The second regenerant is composed of a dilute hydrochloric acid and is used to decompose tetrachloroferrate and elute ferric ions, thereby regenerating the resin. Alternative chemical displacement methods include: (1) displacement of target anions with fluoroborate followed by nitrate or salicylate and (2) displacement of target anions with salicylate followed by dilute hydrochloric acid. The methodology offers an improved regeneration efficiency, recovery, and waste minimization over the conventional displacement technique using sodium chloride (or a brine) or alkali metal hydroxide.

17 Claims, 10 Drawing Sheets

REGENERATION OF STRONG-BASE ANION-EXCHANGE RESINS BY SEQUENTIAL CHEMICAL DISPLACEMENT

STATEMENT REGARDING FEDERALLY SPONSORED RESEARCH

This invention was made with United States Government support under Contract No. DE-AC05-96OR22464 awarded by the Department of Energy to Lockheed Martin Energy Research Corporation and the United States Government has certain rights in this invention.

BACKGROUND OF THE, INVENTION

1. Field Of The Invention

This invention relates to a method for the regeneration of anion exchange resins. More particularly, it relates to chemical displacement techniques using novel extraction mixtures and orders of addition to regenerate strong-base anion exchange resins. The technique is particularly suitable for the regeneration of anion exchange resins which have been synthesized to have a high specificity for large anions having low hydration energy.

2. Background Of The Art

Groundwater remediation has become an important issue in industrialized countries and particularly in those areas which draw drinking water from aquifers. In recent years, two contaminants have been identified which have been found to be difficult to remove when present in small concentrations. Perchlorates and pertechnetates are stable compounds which are highly mobile in underground aquifers. The salts are highly soluble and poorly retained by clays and other subsurface materials. The anions are not volatile, non-filterable, and are not removed by conventional methods such as sedimentation or air stripping techniques.

Perchlorates are manufactured and widely used during the twentieth century with particular application to explosives and rocket fuels. Their distribution is widespread, as documented by Damian, *Environmental Protection*, Jun. 24, 1999, and Urbansky, *Bioremediation Journal* 2, 81 (1998). Methods for quantitation of perchlorates have been developed only recently and chronic exposure data have not been definitively related to specific illnesses.

The pertechnetate anion is the primary chemical form of technetium-99, a (beta-emitting) radionuclide, with a half life of $2.13 \times 10^5$ years in oxygenated groundwater or surface water. Pertechnetate anions in water result almost exclusively from the fission of uranium-235 and plutonium-239. Except for fallout from above ground weapons tests, its occurrence in groundwater is believed to be limited to locations where fissionable material has been handled. Pertechnetate is chemically similar to perchlorate and subject to equivalent difficulties in treatment. Its radioactivity renders it more easily detected and more hazardous biologically.

The use of anion exchange resins in the concentration of pertechnetate is not new. Tc-99m ($t_{1/2}$= 6.0 h) generators for use in nuclear medicine routinely concentrate pertechnetate for patient administration. The concentrations are orders of magnitude higher than those in environmental contamination and the isotope is so short-lived that environmental contamination is not a concern outside of the medical facility. Representative ion exchange materials for this use include those disclosed in U.S. Pat. No. 4,738,834.

Anion exchange resins have been viewed by many as a preferred method for the removal of perchlorates and pertechnetates and various resins have been studied for removal of pertechnetates and perchlorates. Kawaski et al., *Radiochimica Act* 63, 53 (1993) reported adsorption on DOWEX™ 1-X8 and suggested that perchlorate could be used to remove pertechnetate from the resin. Katty, U.S. Pat. No. 5,478,474 discloses a method for removing pertechnetate using phosphinimines covalently bound to a polymer backbone. Regeneration is not addressed in the paper.

Gu et al., *Separations Technology* 6, 123 (1996) addresses the adsorption and recovery of pertechnetate on activated carbon and desorption with anions such as phthalate, chloride, nitrate, sulfate, and salicylate. However, sorption on anion exchange resins and regeneration were not addressed in this paper.

Batista et al. (Paper ENVR 27) and Tripp et al. (Paper ENVR 24) disclose experiments in the regeneration of various anion exchange resins using sodium chloride and report that large volumes appear to be necessary to regenerate activity in resins which show some specificity toward perchlorate [Extended Abstracts, $218^{th}$ ACS National Meeting, New Orleans 1999]. At the same meeting, Guter (Paper ENVR 23) published theoretical studies on the formation of ion pairs and calculated the order of affinity of singly charged ions on resins. Wachsmuth, U.S. Pat. No. 3,989,624, discloses a method for regenerating anion-exchange resins by backwashing with alkali metal hydroxide solution. Similarly, Salem et al., U.S. Pat. No. RE29,680, discloses a method for converting anion-exchange resins from monovalent anion to the hydroxide form. Fleming, U.S. Pat. No. 4,608,176, discloses a method of regenerating strong-base anion-exchange resins sorbed with thiocyanate using ferric ions in which ferric-thiocyanate complex cations are formed and washed from the resin. Whereas this last method uses a ferric salt, the regeneration method is substantially distinct from the method described in this invention and is ineffective in regenerating the anion exchange resins sorbed with perchlorate or pertechnetate because ferric ions do not form complex cations with perchlorate or pertechnetate. Fleming's regeneration method consists of passing a solution of ferric sulfate, ferric chloride, or ferric nitrate in water through the resin, whereby the ferric ion forms a complex cation with the sorbed thiocyanate. The ferric-thiocyanate complex cations thus formed elute from the resin due to charge-repulsion, with the counter-anions (sulfate, nitrate, or chloride in ferric salt) replacing the thiocyanate as the anion on the resin. Thus, ferric cations are used to complex and desorb thiocyanate anions; the thiocyanate anions are not displaced by a secondary anion. As stated above, this method does not work with resins sorbed with perchlorate or pertechnetate and differs from the present invention, whereby ferric chloride is dissolved in a solution (containing HCl, a water-miscible organic solvent, and optionally an alkali-metal chloride salt) to generate some amount of the complex anion tetrachloroferrate, and this solution is passed through the resin whereby the tetrachloroferrate displaces other anions already sorbed on the resin such as perchlorate or pertechnetate. The sorbed tetrachloroferrate is then desorbed from the resin using a second regenerant.

Brown et al, *Perchlorate in the Environment*, E. T. Urbansky, ed. (Kluwor Academic/Plenum) describe a new resin specific for perchlorate and pertechnetate.

Highly selective anion exchange resins offer some advantages over conventional nonselective resins in the treatment of perchlorate-and pertechnetate-contaminated water because of their relatively high efficiency and capacity. For example, Oak Ridge National Laboratory has recently developed a new class of bifunctional anion exchange resins, which are highly selective and efficient for the removal of perchlorate, pertechnetate, and perrhenate from contaminated water (U.S. patent application Ser. No. 08/922,198 U.S. Pat. No. 6,059,975 herein incorporated by reference). However, because these anions are so strongly sorbed, the conventional regeneration technique by washing with a brine (e.g., 12% sodium chloride) or alkali metal hydroxide [U.S. Pat. Nos. 4,151,079; 4,049,772] is ineffective, and no current technology is available to regenerate these highly selective resins so that they can be reused routinely. Because most of these synthetic resins are expensive with a current market price of ~$400 to ~$1000 per cubic foot, the resin itself contributes to a major capital cost for the application of ion-exchange technology to remove perchlorate or pertechnetate from contaminated water or other liquid streams.

The need exists, therefore, for a method whereby the resins specific for perchlorate and pertechnetate may be regenerated for multiple reuse in a manner which concentrates the removed perchlorate and pertechnetate and which can be performed at a minimal cost compared to the cost of resin replacement. The method should be suitable for both the treatment of large aquifers or bodies of standing water as well as for localized facilities to provide potable water on site.

BRIEF SUMMARY OF THE INVENTION

It is an object of this invention to provide regenerants for anion exchange resins having a specificity for large, poorly hydrated anions including perchlorate, pertechnetate, nitrate, periodate, perrhenate, iodide, and thiocyanate. It is a further object of this invention to provide regenerants which may be reused on multiple occasions. It is a further objective of this invention to isolate perchlorate and pertechnetate in a concentrated form so that economic treatment (destruction for perchlorate or burial for pertechnetate) can be done with minimal expense.

These and other objectives of this invention may be achieved by the regeneration of the anion exchange resin using anions formed in newly formulated regenerant solutions having a selectivity toward the cationic site of the resin which is approximately equivalent to that of the perchlorate and the pertechnetate so that, under regeneration conditions, these anions displace perchlorate or pertechnetate. It is a further component of this invention that the regenerant used to displace the perchlorate or pertechnetate may then be efficiently displaced or decomposed with at least a second regenerant anion which may be retained on the resin or exchanged facilely with the anion present on the resin as initially activated.

In a first embodiment, the invention contemplates the use of tetrachloroferrate ($FeCl_4^-$) anion generated in situ, followed by a wash with dilute hydrochloric acid. Alternatively, tetrafluoroborate ($BF_4^-$) may be used to displace the perchlorate or pertechnetate and it is likewise displaced by an anion having a lower specificity and selectivity such as nitrate, hydroxide or salicylate. A final brine and/or a dilute hydrochloric acid wash is sufficient to activate the resin in the chloride form. As a third alternative, salicylate anion generated in a base may be employed as the displacing anion and the resin regenerated in the chloride form by washing with dilute hydrochloric acid. Organic solvents miscible in regenerant solutions may be used to adjust the ionic strength and polarity of the regenerant to maximize the efficiency of displacement.

The objects of the invention, therefore, provide a method and a process for regenerating anion exchange resins either in a fixed bed, in continuous rotating column apparatus, or in a batch process that are used for removing specific anions such as perchlorate, pertechnetate, nitrate, periodate, perrhenate, iodide, thiocyanate, and some organic anions from water or other liquid streams.

DETAILED DESCRIPTION OF THE INVENTION

Figure 1:
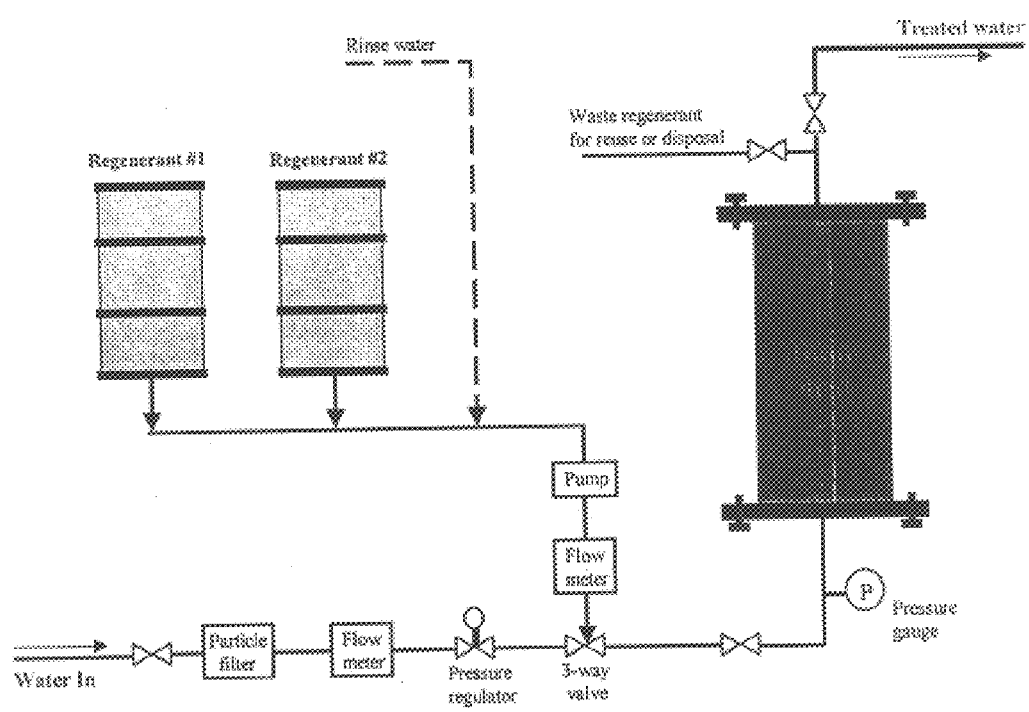
FIG. 1 is a generic diagram of a typical fixed resin bed (or column) used for water treatment.

The efficient removal of perchlorate and pertechnetate by anion exchange resins requires that the resin possess a high specificity for these anions. Contaminated groundwater containing these anions also contains other anions which are both ubiquitous and non-toxic. Resins which have a high capacity for commonly found monovalent anions such chloride, hydroxide and bicarbonate are found not to be especially efficient for the removal of small amounts of perchlorate and pertechnetate. Nitrate, which is a common groundwater contaminant and a health hazard to young children, is removed by several commercial resins such REILLEX™ HPQ, AMBERLITE™ IRA-900 and IRA-904, PUROLITE™ A-520E and EA-850 and SYBRON IONAC™ SR-6 and SR-7, among others. These nitrate-effective resins have been found to be reasonably competent for the removal of perchlorate and pertechnetate. U.S. patent application Ser. No. 08/922,198, filed Sep. 2, 1997, describes a resin which has been optimized for specificity to perchlorate and pertechnetate. It has been found that the increased specificity for these larger, less-hydrated anions results in a spent resin which resists regeneration by washing with dilute acid, concentrated brines, and other conventional low cost regenerants. An experimental resin prepared to the pending application by Purolite International Corporation is designated D-3696. The cost of new resin having a high specificity is currently estimated at between $400 and $1000 per cubic foot and it is not expected that this cost will be reduced dramatically in the foreseeable future. This invention is directed to methods for regeneration by displacement of perchlorate and pertechnetate anions using ions which are similar in size, hydration and affinity for the custom resins and other anion exchange resins including but not limited to those described above and which can be rendered more efficient by adjustment of the solvent system in which they are delivered to further bias the equilibrium in favor of displacement of perchlorate and pertechnetate ions. The specific displacing anions found to be useful for the practice of this invention are tetrachloroferrate, tetrafluoroborate and salicylate. In each case, these displacing regenerants may be removed inexpensively using second regenerant solutions and the original resin quickly reconstituted in its active form. Further, these regenerants may be used multiple times to concentrate the perchlorate and pertechnetate for treatment or burial, as appropriate.

The tetrachloroferrate method uses a two-step regeneration process that is comprised of two types of regenerants. The first regenerant is a mixture of ferric chloride, a water-miscible organic solvent, hydrochloric acid and water to form tetrachloroferrate according to the following chemical equilibrium:

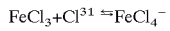
$$FeCl_3 + Cl^- \rightleftharpoons FeCl_4^-$$

A relatively high concentration of hydrochloric acid (or free chloride) and a water-miscible organic solvent such as ethanol, methanol, acetonitrile, acetone, n-propanol, isopropanol, glycerol, ethylene glycol, propylene glycol, polyethylene glycols (PEGs), or mixtures thereof are used to enhance the formation of tetrachloroferrate ($FeCl_4^-$; i.e., to drive the chemical equilibrium to the right which is also the form of the ion which is strongly sorbed on the resin).

The second regenerant is comprised of a dilute acid, preferably hydrochloric acid in water, in which tetrachloroferrate dissociates according to the following chemical equilibria:

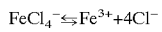
$$FeCl_4^- \rightleftharpoons Fe^{3+} + 4Cl^-$$

$$FeCl_4^- \rightleftharpoons FeCl^{2+} + 3Cl^-$$

$$FeCl_4^- \rightleftharpoons FeCl_2^+ + 2Cl^-$$

Therefore, the positively charged ferric ions and excess $Cl^-$ anions are eluted off the resin bed with dilute hydrochloric acid (regenerant #2), and the anion exchange resin is regenerated to its original state with $Cl^-$ as the anion. The resin bed or column can then be rinsed with water or dilute bicarbonate solution and is ready for reuse.

Alternatively, $BF_4^-$ is used as the first regenerant and a nitrate salt is used as the second regenerant. When salicylate is the displacing anion as the first regenerant, a basic solution is required to enhance its solubility. The resin is regenerated with dilute hydrochloric acid, preferably using a water-miscible organic solvent to enhance the solubility of the salicylic acid.

The preferred regenerant #1 in the tetrachloroferrate method is comprised of ~8% (w/v) ferric chloride, ~6% (w/v) hydrochloric acid, ~35% (v/v) ethanol, and the balance water. The concentration of ferric chloride may range from 0.5 to 40%, and hydrochloric acid concentration from 1 to 30%. (w/v). Chloride anions (up to 30% (w/v)) such as sodium chloride may be added to enhance the formation of tetrachloroferrate. The preferred organic solvent is ethanol but other water-miscible organic solvents such as methanol, acetonitrile, acetone, n-propanol, isopropanol, glycerol, ethylene glycol, propylene glycol, and PEGs or mixtures thereof can be used in a concentration range from 0 to 80%. The rest is water. An explanation for the utility of an organic solvent in this capacity may be found in Vladoscu et al., *Revue Roumain de Chemie*, 25, 135 (1980).

Tetrachloroferrate ($FeCl_4^-$) is formed in equilibrium with other Fe(III) species under such conditions and is used to displace sorbed anions such as perchlorate, pertechnetate, nitrate and other poorly hydrated ions on anion exchange resins.

The invented resin regeneration methodology is suitable for a number of applications. Examples of suitable applications include: (1) regeneration of resin that is used for treatment of perchlorate-contaminated water and other liquid streams; (2) regeneration of resin that is used for treatment of pertechnetate-contaminated water and other liquid streams and recovery of pertechnetate isotope; (3) regeneration of resin that is used for removal or recovery of nitrate, perrhenate, periodate, iodide, and thiocyanate from water and other liquid streams; and (4) recovery of other precious metals or transitional metals (such as perrhenate, $Au(CN)_4^-$ and $AuCl_4^-$) in anionic forms from water or other liquid streams.

Suitable methods for conducting the resin regeneration are those resulting in intimate contact between the regenerant liquid and the resin. Examples of suitable methods include cocurrent or countercurrent flow-through fixed beds or columns, fluidized beds, stirred tanks, and batch tanks. The contact may occur batchwise, semi-batchwise, continuously, or semi-continuously. Preferably, the regenerant is contacted with the anion exchange resin in a continuous system employing a packed ion-exchange column, as shown in FIG. 1.

The time required for contact will depend upon numerous factors, such as: (1) the properties of the anion exchange resin employed; (2) temperature at which the contact is conducted; (3) the concentration of the regenerant; (4) the degree of regeneration or recovery desired. In general, the temperature is only limited by the freezing point and boiling point. Although ambient temperature ~20° C.) is preferred, a higher temperature favors the regeneration and therefore reduces the time required for regeneration. In general, temperatures from about 5 to about 80° C. are suitable.

The regenerant liquid can be recycled or reused for many regeneration cycles for waste minimization and additional cost savings. Depending on the loading of the displaced anion concentration in the regenerant solution, the regenerant may be reused for about 2–20 cycles. The spent regenerant #1 may then be disposed of or neutralized with a strong base such as potassium hydroxide or sodium hydroxide. Ferric ion precipitates (or flocculates) out as iron oxyhydroxides at pH above ~4. The displaced anions (such as perchlorate or pertechnetate) may partially or completely adsorb on and/or coprecipitate with iron oxyhydroxides. In the case of perchlorate displacement, potassium hydroxide is the preferred neutralizing agent so that potassium perchlorate precipitates out with iron oxyhydroxides because of its relatively low solubility ($K_{sp} \times 1.05 \times 10^{-2}$). The precipitated iron oxyhydroxide sludge may then be separated from the clear brine solution for disposal or recovery. The waste iron oxyhydroxides may also be solidified or further treated to remove contaminant anions such as perchlorate by biodegradation.

The preferred regenerant #2 is comprised of dilute hydrochloric acid at about 0.01 mol $L^{-1}$ although its concentration may range from about zero to about 1 mol $L^{-1}$. Other inorganic acids such as nitric acid and sulfuric acid may also be used, but that would require a brine treatment to regenerate the chloride form of the resin. The spent regenerant #2 can be neutralized with strong base such as sodium hydroxide and potassium hydroxide so the residual ferric ion should be precipitated out, leaving a clear dilute salt solution of sodium chloride or potassium chloride. The final waste form is dilute sodium or potassium chloride (0.01 mol $L^{-1}$), which may be disposed of in situ or via municipal waste water treatment plant (POTW).

The tetrafluoroborate method provides a three-step process to regenerate anion exchange resins. The first step includes the preparation of the first regenerant (regenerant #1) which is comprised of a mixture of tetrafluoroborate (or fluoroborate or $BF_4^-$) as the Na salt and water. The first regenerant may additionally contain a water-miscible organic solvent. The organic solvent may include ethanol, methanol, acetonitrile, acetone, n-propanol, isopropanol, glycerol, ethylene glycol, propylene glycol, PEGs or other water-miscible organic solvents in a concentration range from zero to 80%, preferably at 30–40%. The fluoroborate concentration is in the range of ~0.1–20%, preferably at about 4%, and is used to displace sorbed anions such as perchlorate, pertechnetate, or periodate, perrhenate, iodide, or other organic anions on the exchange resins.

The second step of the regeneration process includes the preparation of the second regenerant (regenerant #2), which preferrably is comprised of a nitrate (although some other anions such as hydroxide, chloride, and salicylate or their mixtures are suitable), which can be mixed with a water-miscible organic solvent. The organic solvent may include ethanol, methanol, acetonitrile, acetone, isopropanol, n-propanol, glycerol, ethylene glycol, propylene glycol, PEGs or other water-miscible organic solvents in a concentration range from about zero to 80%, preferably at 30–40% (v/v). The nitrate concentration is in the range of about 0.2–30% (w/v), preferably at about 8% (w/v), and is used to displace sorbed fluoroborate on anion exchange resins.

An alternative formulation of the second regeneration step is treatment with an acid such as HCl, preferably combined with mild heating. The $BF_4^-$ anion in aqueous solution is unstable to hydrolysis of fluoride ion to form the species $BF_3(OH)^-$ which is eventually hydrolyzed to $B(OH)_3$ and $F^-$. The equilibrium strongly favors the $BF_4^-$ species unless the $F^-$ anion can be removed. Protonation is an easy way to drive this equilibrium and the rate constant for hydrolysis of $BF_4^-$ in 1 M acid is approximately $10^{-2}$ $min^{-1}$. The acid catalyzed hydrolysis is an effective method of breaking down the tetrafluoroborate anion, allowing it to be eluted from the resin with chloride.

The third step of the regeneration process includes the preparation of a third regenerant (regenerant #3), which is a brine (such as 12% sodium chloride). This step is to convert nitrate-loaded resins to the chloride form resins for reuse. However, it is optional depending on applications and regulatory requirements because nitrale-loaded resins may be directly used for treatment of water or other liquid streams containing perchlorate, pertechnetate, periodate, perrhenate, iodide, thiocyanate, and some organic anions. A water rinse between each step is necessary only to remove excess amount of regenerant anions left in the resin.

The objects of this invention, therefore, provide another method and a process for regenerating anion exchange resins either in a fixed bed or in a series of continuous rotating columns or in a batch process that are used for removing specific anions such as perchlorate, pertechnetate, periodate, perrhenate, iodide, thiocyanate, and some organic anions from water or other liquid streams.

A method using salicylate also provides a two-step process to regenerate anion exchange resins that is used for removing certain anions such as perchlorate, pertechnetate, and nitrate in a fixed bed or a series of rotating exchange columns. The first step includes the preparation of the first regenerant (regenerant #1) which is comprised of a mixture of salicylate (or salicylic acid), a water-miscible organic solvent, a strong base, and water. The salicylate concentration is in the range of about 1–40%, preferably at about 12%, and is used to displace sorbed anions such as perchlorate, pertechnetate, or nitrate on anion exchange resins. The organic solvent may include methanol, acetonitrile, acetone, ethanol, n-propanol, isopropanol, or other water-miscible organic solvents in a concentration range from zero to 80%, preferably at 30–40%. A strong base such as sodium hydroxide or potassium hydroxide is used to provide a regenerant pH somewhat above neutral, preferably above 12 so that salicylate anion is fully dissociated.

The second step of the regeneration process includes the preparation of the second regenerant (regenerant #2), which is comprised of a dilute hydrochloric acid mixed with a water-miscible organic solvent. The organic solvent may include methanol, acetonitrile, ethanol, acetone, n-propanol, isopropanol, or other water-miscible organic solvents in a concentration range from ~1 to 80%, preferably at 30–40%. The hydrochloric acid concentration is in the range of ~0.001–10%, preferably at about 1%, and is used to protonate and thereby displace sorbed salicylate on anion exchange resins. The resin bed may be finally rinsed with clean water or dilute soda (sodium bicarbonate) solution and is ready for reuse.

One of the advantages of using salicylate as a regenerant is that salicylate may be readily recovered for reuse after each regeneration cycle. This was done by acidification of the alkaline salicylate regenerant solution at pH <3 because of a relatively low solubility of salicylic acid in an aqueous solution.

All three methods are suitable for routine regeneration of resin used for removal of perchlorate and pertechnetate, especially at locations where large amounts of contaminated water must be treated. Typically, the resin is used in packed column form and the contaminated water is pumped through the column. Depending on the location, the treated water may be returned to the aquifer or kept separate thereafter.

Regeneration of the resin would be performed only after breakthrough had been observed. Breakthrough may be defined in terms of the percent of contaminant in the effluent water or in terms of an absolute concentration, depending on the type of source and intended use of the treated water. For purposes of this disclosure, we have defined breakthrough as the ratio (or percentage) of the effluent contaminant concentration (after treatment) to the influent contaminant concentration (before treatment). Ion exchange resin are normally employed as a fixed bed column with continuous plug flow of the stream under treatment through the column. The sorbate (anions in this case) sorbs onto the portion of the resin column which initially contacts with solution, whereas parts of the resin column which come in contact with the solution later have a gradient in concentration of the sorbate from the negligible to near equilibrium. As the saturated fraction of the resin increases, the effluent from the column shows a characteristic increase in the sorbate concentration versus volume treated (at constant flow rate). A plot of the sorbate concentration in the effluent, divided by the concentration in the influent stream, versus the volume of liquid passed through the column had an "S" shape, and this behavior is often called a breakthrough curve.

Likewise, when determining regeneration efficiency, it is necessary to determine the degree of completeness of the regeneration which is desired. For purposes of this disclosure, regeneration is defined as removal of the sorbed anion (such as $ClO_4^-$ and $TcO_4^-$) and restoration of the resin to the chloride form.

When used in the field, the regenerant may be recycled repeatedly through the column for waste minimization because of a relatively low concentration of perchlorate or pertechnetate in the regenerant-solution (in comparison with the regenerant anion concentration).

It is contemplated that when used in the field for large aquifers, regeneration would occur 4–5 times each year and that multiple columns would be used so that a constant volume would be pumped and treated.

The invention will be described further in terms of the following examples.

COMPARATIVE EXAMPLE 1

The experiment was performed first by equilibrating 0.1 g resin (dry-weight equivalent) with 100 mL of pertechnetate test solution, which is composed of 6 $\mu$M pertechnetate, 60 mM each of NaCl, NaNO$_3$, and Na$_2$SO$_4$. Both the bifunctional (Purolite™ D-3696) and the commercial monofunctional (Purolite™ A-520E) anion exchange resins were used for the experiment. After equilibrating for 24 h, the supernatant solution (depleted with pertechnetate) was decanted and replaced with a regenerant solution of 0.5M FeCl$_3$, 3M HCl, and 50% ethanol. Samples were then taken periodically to determine the rate of pertechnetate desorption by liquid scitillation counting of Tc-99 radioactivity. The results of this single batch example are shown in Table 1.

TABLE 1

Desorption of pertechnetate (TcO$_4^-$) sorbed on a bifunctional (Purolite D-3696) and a commercial anion exchange resin (Purolite ™ A-520E) by equilibrating with a regenerant composed of 0.5 M FeCl$_3$, 3 M HCl, and 50% ethanol in a single batch test.

| Time (h) | Purolite ™ D-3696 (% desorbed) | Purolite ™ A-520E (% desorbed) |
| --- | --- | --- |
| 0.17 | 8.3 | 48.5 |
| 0.5 | 17.1 | 72.1 |
| 24 | 68.5 | 73.8 |

COMPARATIVE EXAMPLE 2

The resins D-3696 and A-520E described above were equilibrated with pertechnetate as described above. Regenerant solutions were prepared by dissolving NaBF$_4$ in deionizied water and in deionized water: ethanol (50:50 by volume) to obtain a 0.8 M solution of BF$_4^-$. The regenerant solutions were used as described in Comparative Example 1. Samples were taken to determine the rate of pertechnetate desorption and the results are shown in Table 2.

TABLE 2

Desorption of pertechnetate (TcO$_4^-$) sorbed on a bifunctional (Purolite ™ D-3696) and a commercial anion exchange resin (Purolite ™ A-520E) by equilibrating with a regenerant composed of 0.8 M NaBF$_4$ with or without 50% ethanol in a single batch test.

| Time (h) | Purolite ™ D-3696 No ethanol (% desorbed) | Purolite ™ D-3696 50% ethanol (% desorbed) | Purolite ™ A-520E No ethanol (% desorbed) |
| --- | --- | --- | --- |
| 0.17 | 17.5 | 26.1 | 48.3 |
| 0.5 | 31.3 | 52.9 | 66.2 |
| 24 | 77.3 | 100.2 | 77.5 |

TABLE 3

Desorption of pertechnetate (TcO$_4^-$) sorbed on a commercial anion exchange resin (Purolite ™ A-520E) by equilibrating with a regenerant composed of 0.4 M Salicylic acid and 0.5 M NaOH with or without 50% acetonitrile in a single batch test.

| Time (h) | Purolite ™ A-520E 50% acetonitrile (% desorbed) | Purolite ™ A-520E No acetonitrile (% desorbed) |
| --- | --- | --- |
| 0.17 | 17.6 | 11.8 |
| 0.5 | 36.1 | 23.2 |
| 24 | 64.0 | 49.6 |

EXAMPLE 1

Figure 2:
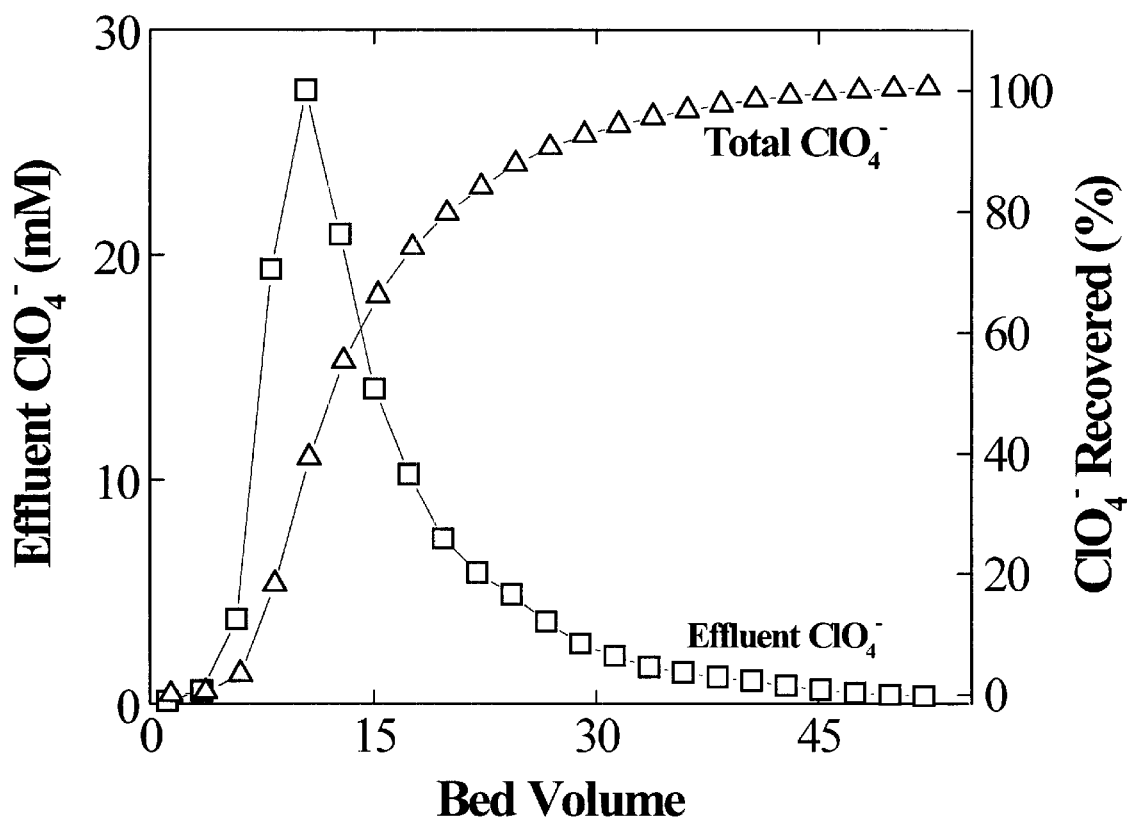
FIG. 2 illustrates the elution and recovery of perchlorate on the Purolite™ A-520E resin column during the regeneration by using the tetrachloroferrate displacement technique.

This example shows the elution and recovery of perchlorate on a Purolite™ A-520E resin column (10×22 mm) during the regeneration by using the tetrachloroferrate displacement (Comparative Example 1). Results shown in FIG. 2 indicated a rapid desorption of adsorbed perchlorate on the Purolite™ A-520E resin and a nearly 100% recovery of adsorbed perchlorate. Elution was essentially complete after approximately 45 bed volumes of displacement with tetrachloroferrate, and a good mass balance was observed.

EXAMPLE 2

Figure 3:
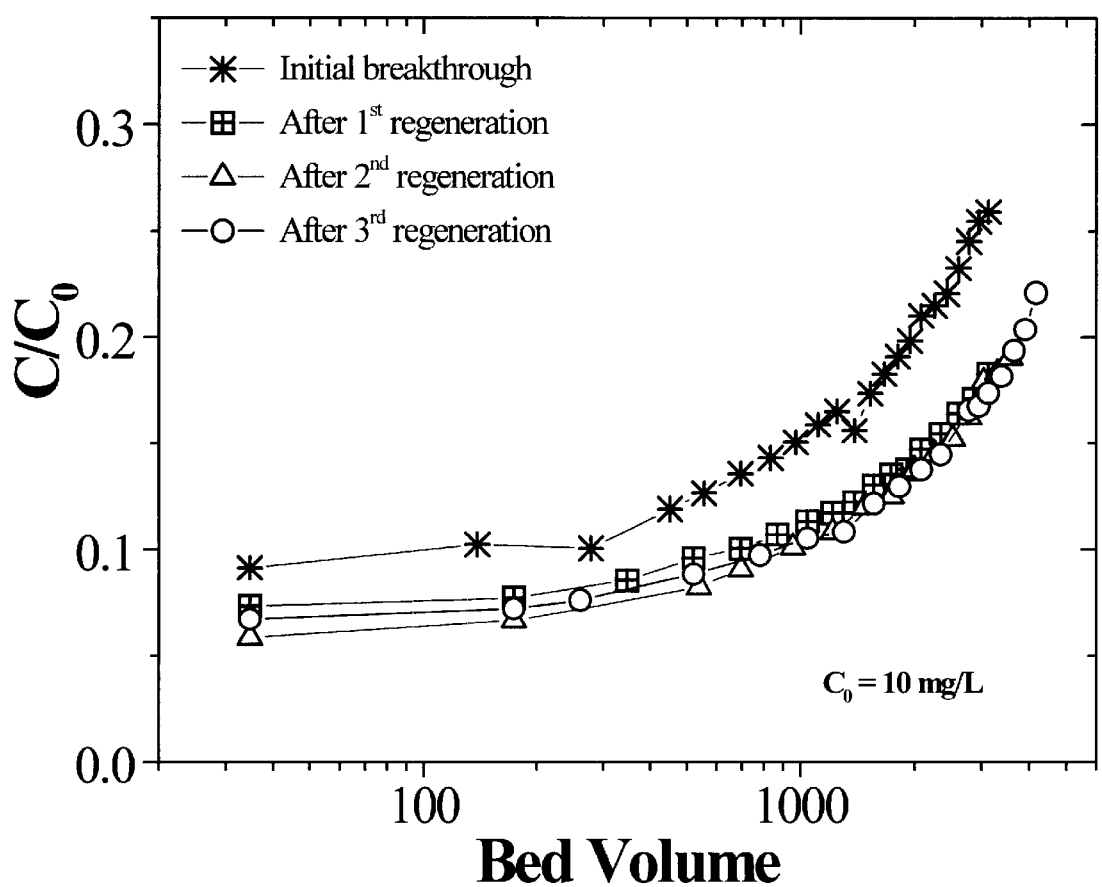
FIG. 3 illustrates the performance of a commercial nitrate-selective anion exchange resin (Purolite™ A-520E) for perchlorate removal after repeated regeneration (3 times) using the tetrachloroferrate displacement regeneration.

This example illustrates the performance of a commercial nitrate-selective anion exchange resin (Purolite™ A-520E) for perchlorate removal after repeated regeneration (3 times) with the tetrachloroferrate displacement technique. The data in FIG. 3 shows the perchlorate breakthrough ($C/C_0$) in a small packed column (10×22 mm) running at 30 mL min$^{-1}$ in the laboratory. The $C/C_0$ is the ratio of effluent percilorate concentration versus the initial influent concentration of 10 mg L$^{-1}$ in a synthetic test solution (consisted of 3 mM NaHCO$_3$, 1 mM CaCl$_2$, 0.5 mM MgCl$_2$, 0.5 mM Na$_2$SO$_4$, and 0.5 mM KNO$_3$). Results indicated a nearly identical breakthrough of perchlorate after repeated regeneration without any apparent loss of performance. In fact, the regenerated column appeared to perform slightly better than the initial column which may be due to a thorough washing and opening of additional micropores and adsorption site on the A-520E resin during the regeneration process (column conditioning).

EXAMPLE 3

Figure 4:
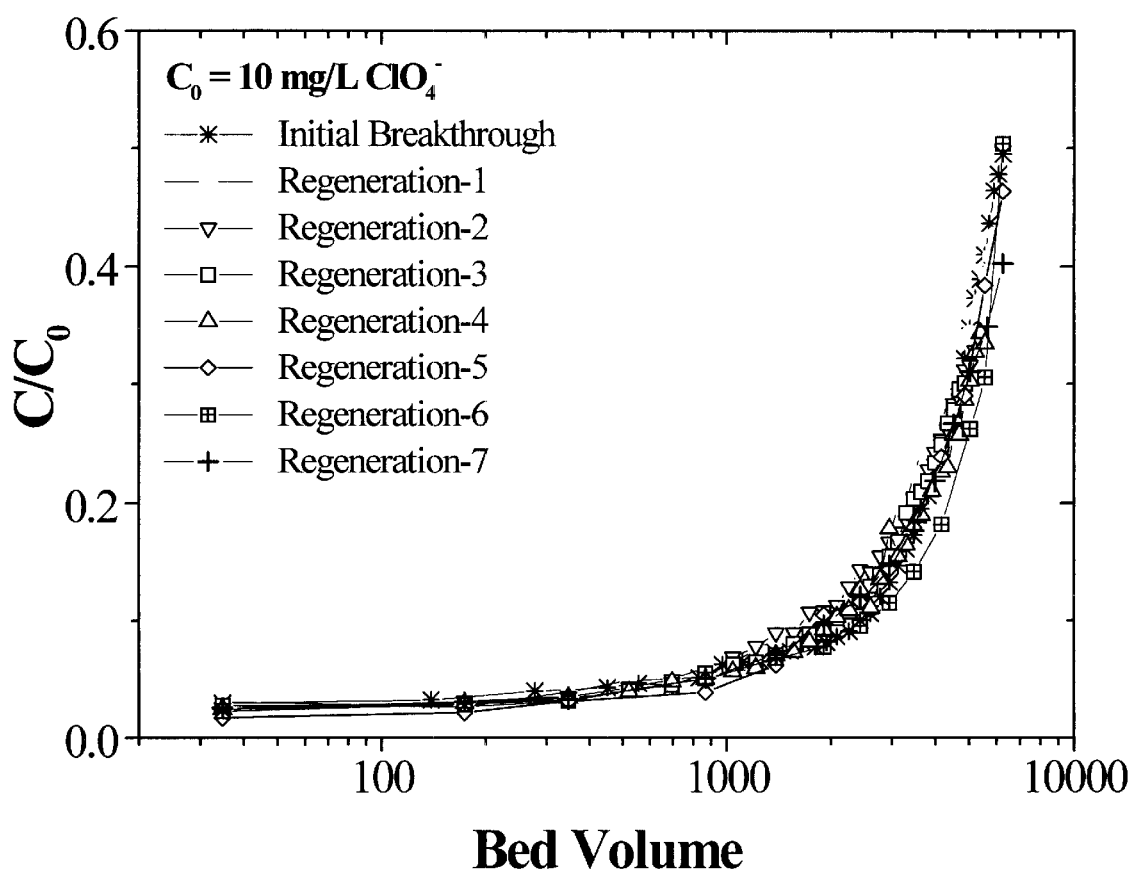
FIG. 4 illustrates the performance of a highly-selective bifunctional anion exchange resin, D-3696 (prepared by Purolite International), for perchlorate removal after repeated regeneration (7 times) with tetrachloroferrate displacement regeneration technique.

This example demonstrates the performance of a highly-selective bifunctional anion exchange resin, D-3696, prepared by Purolite International (to specifications provided by Oak Ridge National Laboratory, U.S. patent application Ser. No. 08/922,198) for perchlorate removal after repeated regeneration (7 times) with the tetrachloroferrate displacement technique. The data in FIG. 4 show the perchlorate breakthrough ($C/C_0$) in a small packed chromatographic column (10×22 mm) running at 30 mL min$^{-1}$ in laboratory. Note that the resin had been used for groundwater treatment at a field site in northern California and was a subsample from the resin recovered from the field. The $C/C_0$ is the ratio of effluent perchlorate concentration versus the initial influent concentration at 10 mg L$^{-1}$ in a synthetic test solution (consisted of 3 mM NaHCO$_3$, 1 mM CaCl$_2$, 0.5 mM MgCl$_2$, 0.5 mM Na2SO$_4$, and 0.5 mM KNO$_3$). Results of ClO$_4^-$ breakthroughs on the regenerated columns were compared with that of an untreated D-3696 resin column (i.e., the initial breakthrough) so that the effectiveness of the regeneration process could be directly assessed. The data show a complete or nearly complete regeneration of the resin without any indication of significant deterioration or loss of performance for ClO$_4^-$ removal. To demonstrate the efficiency of displacement the last three regenerations were conducted by re-using the same chemical regenerant solution from previous regeneration cycles in an attempt to minimize waste generation.

EXAMPLE 4

Figure 5:
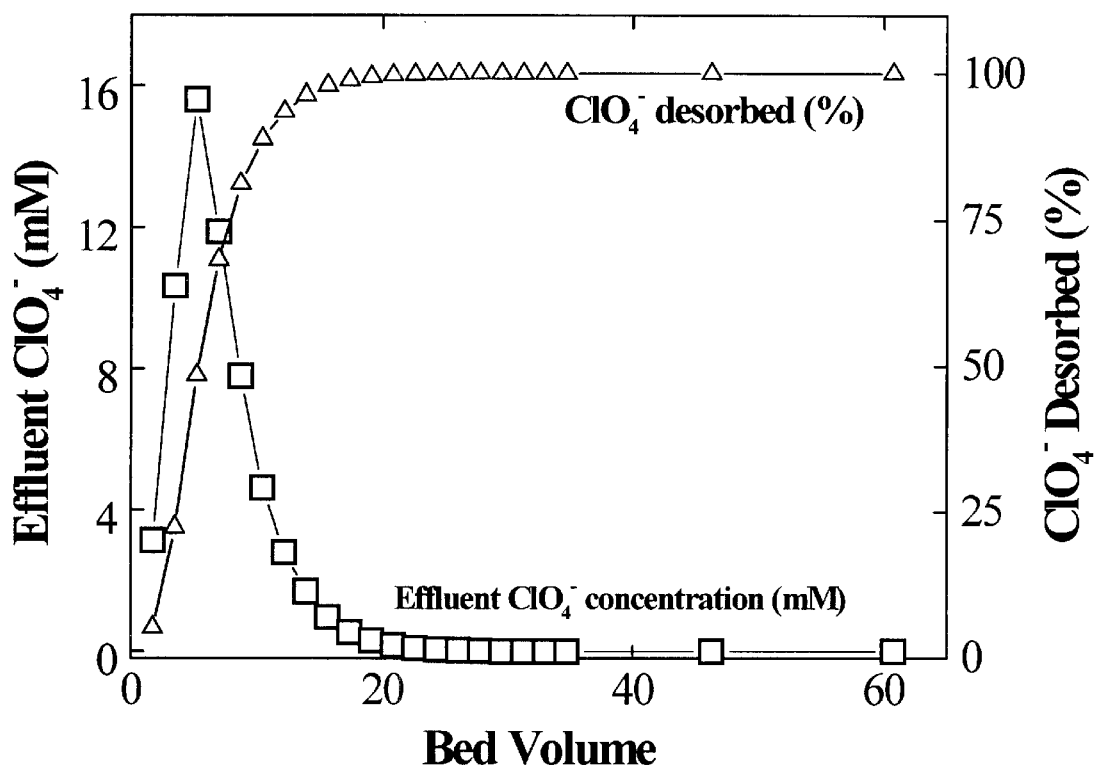
FIG. 5 illustrates the elution and recovery of perchlorate on the D-3696 bifunctional resin during regeneration using the tetrafluoroborate displacement method.

A column (10×22 mm) was packed with D-3696 as described in Example 3. A perchlorate solution as described in Example 3 was run through the resin at 30 mL min$^-$ in the laboratory to determine breakthrough. A regenerant solution containing 0.8 M NaBF$_4$ in 50% ethanol was run through the resin and the concentration of perchlorate measured. The results are shown in FIG. 5. The elution is effectively completed at 25 bed volumes of regenerant and approximately 100% perchlorate recovery is demonstrated by exhaustive elution.

EXAMPLE 5

Figure 6:
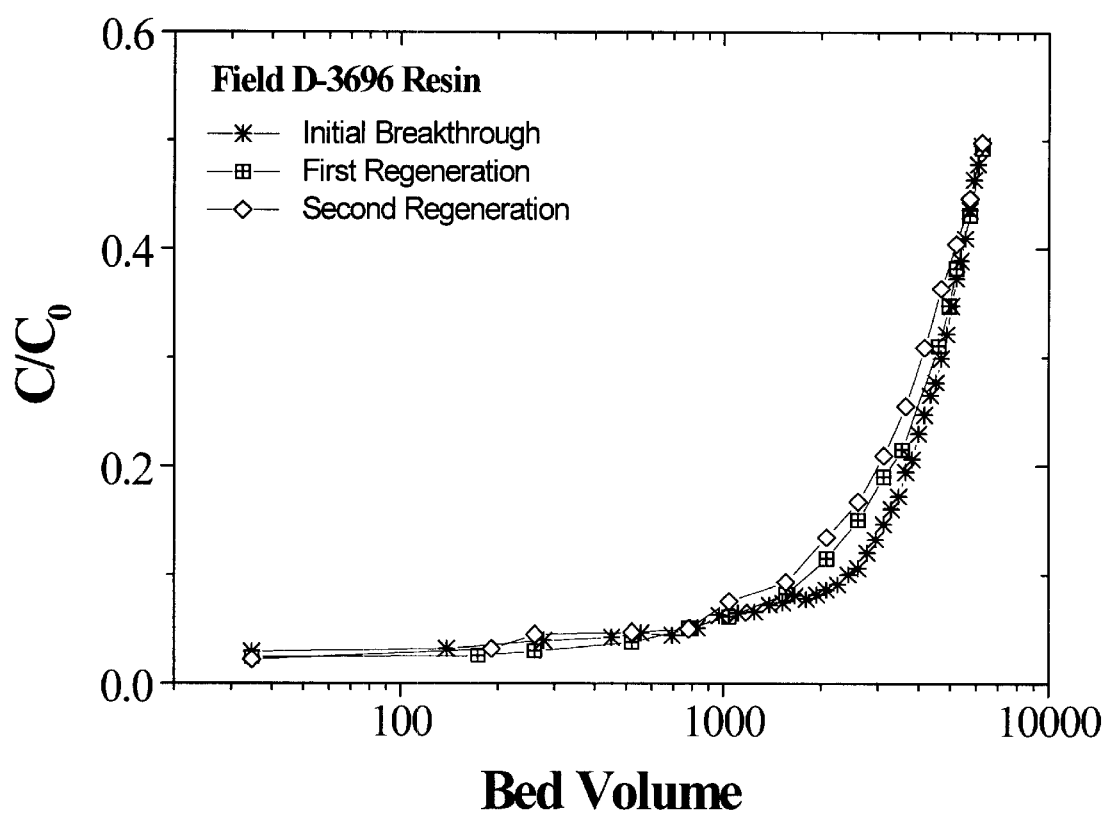
FIG. 6 illustrates the performance of bifunctional anion exchange resin D-3696 for perchlorate removal after regeneration with tetrafluoroborate followed by nitrate displacement.

The resin of Example 4 after elution with BF$_4^-$ was regenerated using a solution of sodium nitrate (1M) in 30% ethanol. After ~80 bed volumes had been run through the column, the column was challenged with perchlorate solution under the same conditions as described in Example 4. The data for the first and a second regeneration are shown in FIG. 6. Minimal deterioration is observed even though the resin had not been returned to its original (chloride) form.

EXAMPLE 6

A D-3696 packed column was loaded with perchlorate until breakthrough as described in Example 4.

Figure 7:
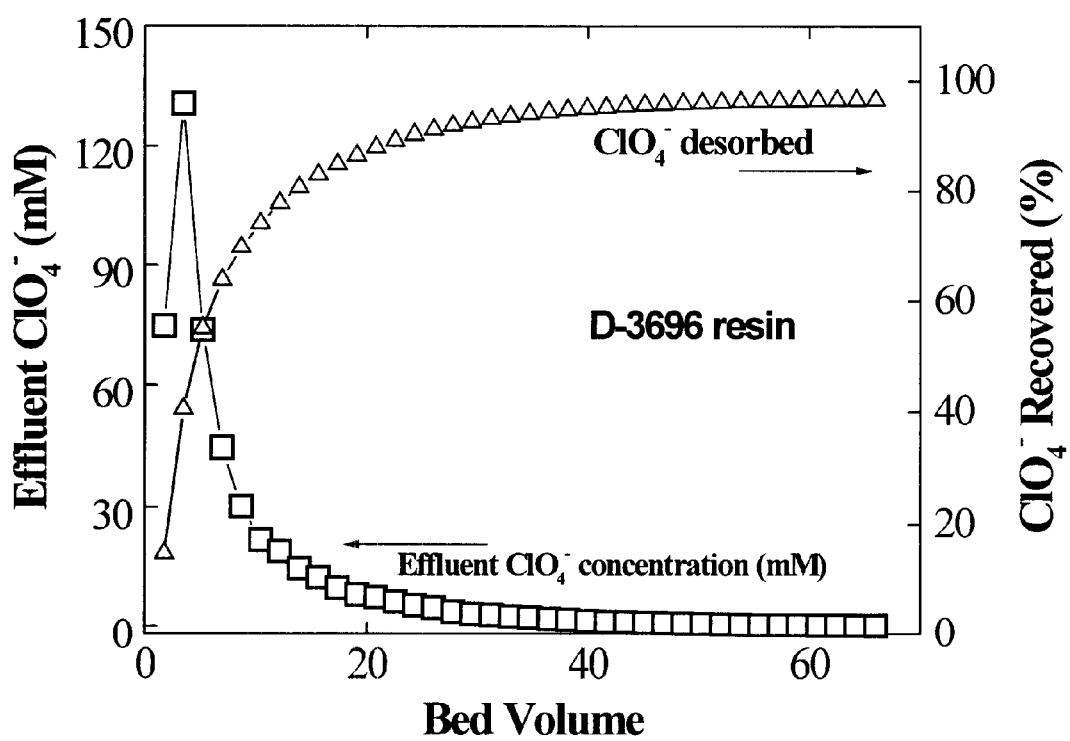
FIG. 7 shows the elution and recovery of perchlorate from the D-3696 bifunctional resin column during regeneration by using salicylate displacement.

A 0.4M salicylic acid, 0.5M sodium hydroxide solution was prepared in 50% acetonitrile and run through the perchlorate-loaded resin column. The concentrations of eluted perchlorate is shown in FIG. 7. Elution is nearly complete by 50 bed volumes of elution with the salicylate regenerant.

EXAMPLE 7

Figure 8:
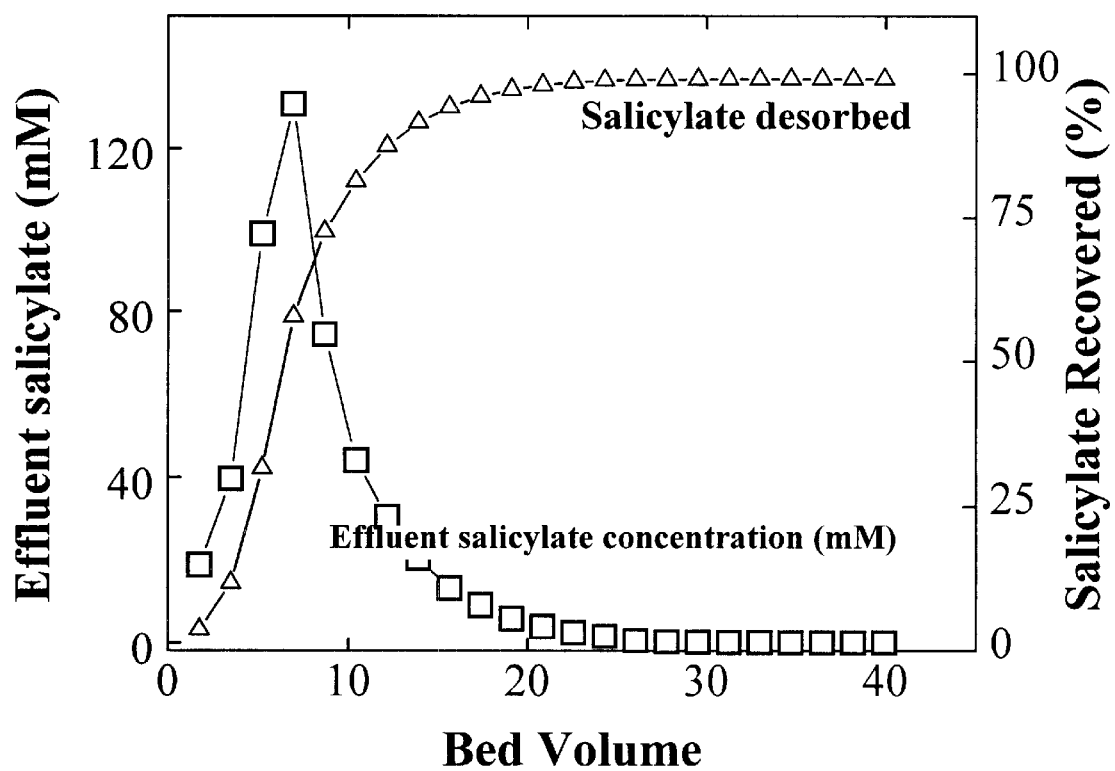
FIG. 8 illustrates the elution and recovery of salicylate from the D-3696 bifunctional resin column during second-step regeneration using salicylate followed by dilute hydrochloric acid.

Removal of the salicylate from the eluted column of Example 6 was accomplished by passing through the column a solution of 1% hydrochloric acid in 40% (w/v) methanol. Elution of the salicylate and regeneration of the chloride form of the resin is attained at about 25 bed volumes as shown in FIG. 8.

EXAMPLE 8

Figure 9:
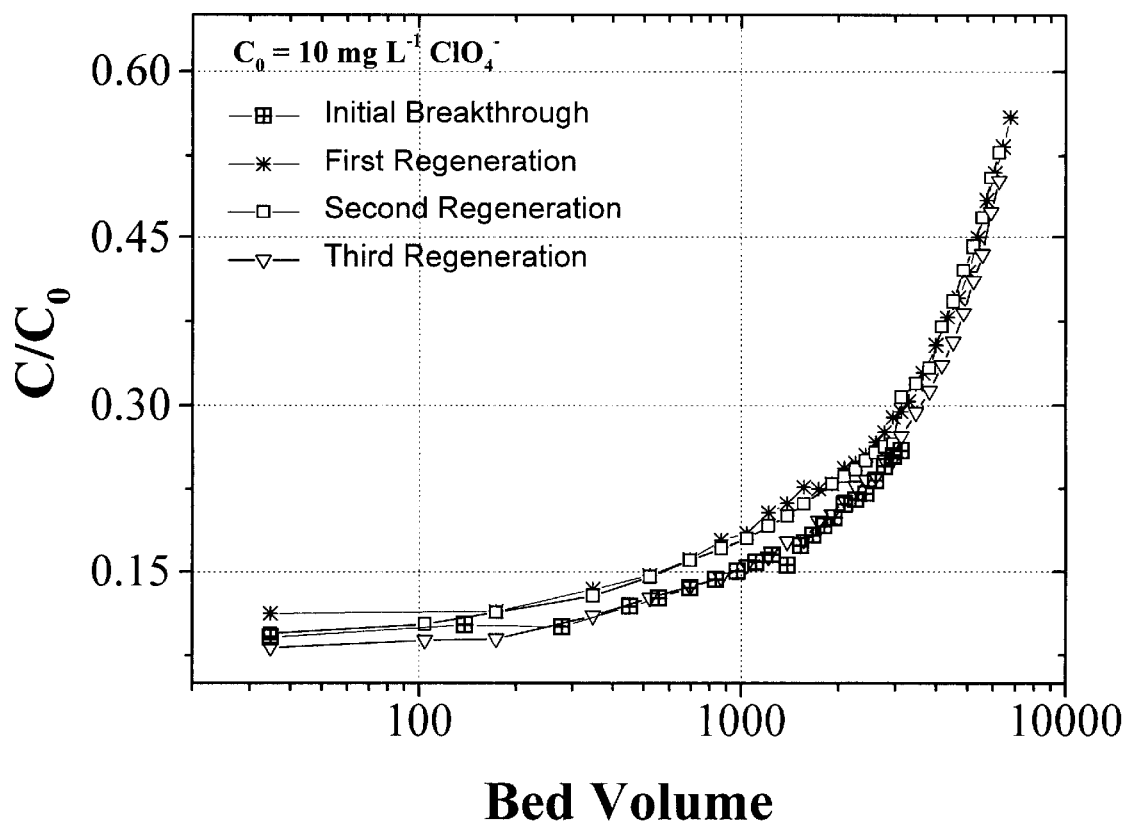
FIG. 9 illustrates performance of a highly-selective bifunctional anion exchange resin, D-3696, for perchlorate removal (in both laboratory and field experiments) after regeneration with salicylate followed by dilute hydrochloric acid displacement.
Figure 10:
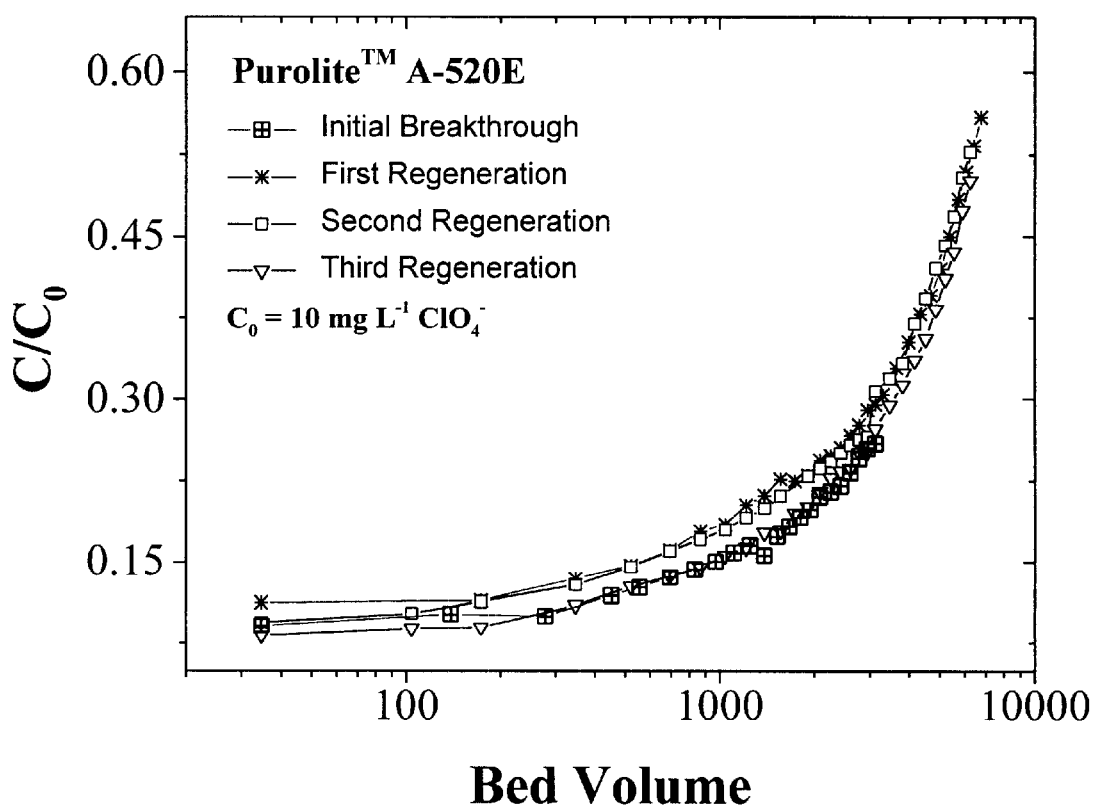
FIG. 10 demonstrates the performance of a commercial nitrate-selective anion exchange resin (PUROLITE™ A-520E) for perchlorate removal after repeated regeneration with salicylate displacement technique.

The salicylate-regenerated D-3696 columns were challenged with a perchlorate solution as described in the previous examples #6 and #7. Note that one of the resin columns was used in a field experiment at a perchlorate-contaminated site in California. The result is shown in FIG. 9. Both the regenerated columns performed as effectively as the original column before regeneration. For comparison, FIG. 10 illustrates the performance of a commercial nitrate-selective anion exchange resin (PUROLITE™ A-520E) for perchlorate removal after repeated regeneration with the salicylate displacement technique.

These examples are provided to illustrate the invention but in no way limit the invention. Modifications which may be apparent to those of skill in the art are considered to be a part of this disclosure.

We claim:

1. A method for eluting strongly-sorbed anions from and regenerating anion-exchange resins comprising eluting a resin with a first regenerating solution comprising ferric chloride (FeCl$_3$), wherein tetrachloroferrate (FeCl$_4^-$) anionic species are formed in equilibrium with excess amount of chloride (Cl$^-$), followed by washing said resin with at least one additional regenerant solution in which tetrachloroferrate species dissociate.

2. A method according to claim 1 wherein said strongly sorbed anions is selected from the group comprising perchlorate, pertechnetate, nitrate, iodide, periodate, perrhenate, and thiocyanate.

3. A method according to claim 1 wherein said strongly sorbed anion is perchlorate.

4. A method according to claim 1 wherein said strongly sorbed anion is pertechnetate.

5. A method according to claim 1 wherein the anion-exchange resins have quaternary ammonium or N-alkyl pyridinium anion-exchange sites.

6. A method according to claim 1 wherein said first regenerating solution comprises ferric chloride, hydrochloric acid a water miscible organic solvent, and water.

7. A method according to claim 6 wherein said ferric chloride concentration is between 0.5 and 40% (w/v).

8. A method according to claim 7 wherein said ferric chloride concentration is between 8 and 10% (w/v).

9. A method according to claim 6 wherein said water miscible organic solvent of said first regenerating solution comprises ethanol, methanol, acetonitrile, acetone, n-propanol, isopropanol, glycerol, ethylene glycol, propylene glycol, polyethylene glycols, and mixtures thereof.

10. A method according to claim 6 wherein said water miscible organic solvent is present in a concentration range of zero to 80% (vol/vol).

11. A method according to claim 10 wherein said water miscible organic solvent is present in a concentration of 30–40% (vol/vol).

12. A method according to claim 6 wherein said hydrochloric acid concentration is between 1 and 30% (w/v).

13. A method according to claim 12 wherein said hydrochloric acid concentration is between 8 and 12% (w/v).

14. A method according to claim 1 further comprising an alkali metal chloride salt in an amount up to 30% (w/v).

15. A method according to claim 1 wherein said at least one additional regenerant is selected from the group consisting of hydrochloric acid, nitric acid, and sulfuric acid.

16. A method according to claim 15 wherein said at least one additional regenerant is hydrochloric acid.

17. A method according to claim 16 wherein said hydrochloric acid concentration is between 0 and 3% (w/v).

* * * * *